(12) United States Patent
Cooper et al.

(10) Patent No.: US 9,065,264 B2
(45) Date of Patent: Jun. 23, 2015

(54) SYSTEM FOR MOUNTING AN ELECTRICAL FIXTURE TO AN ELECTRICAL JUNCTION BOX

(75) Inventors: James A. Cooper, Maitland (CA); Hon Man Kuan, Shatin (CN)

(73) Assignee: CANARM LTD., Brockville (CA)

( * ) Notice: Subject to any disclaimer, the term of this patent is extended or adjusted under 35 U.S.C. 154(b) by 33 days.

(21) Appl. No.: 13/980,011

(22) PCT Filed: Jan. 17, 2012

(86) PCT No.: PCT/CA2012/050028
§ 371 (c)(1),
(2), (4) Date: Jul. 16, 2013

(87) PCT Pub. No.: WO2012/097453
PCT Pub. Date: Jul. 26, 2012

(65) Prior Publication Data
US 2013/0292149 A1    Nov. 7, 2013

Related U.S. Application Data

(60) Provisional application No. 61/433,440, filed on Jan. 17, 2011, provisional application No. 61/543,552, filed on Oct. 5, 2011.

(51) Int. Cl.
*H02G 3/16* (2006.01)
*H02G 1/00* (2006.01)
(Continued)

(52) U.S. Cl.
CPC . *H02G 3/16* (2013.01); *H02G 1/00* (2013.01); *Y10T 29/49208* (2015.01); *H02G 3/14* (2013.01); *H02G 3/18* (2013.01)

(58) Field of Classification Search
CPC ............. H02G 3/16; H02G 1/00; H02G 3/00; H02G 3/18; H02G 3/14; H02G 3/30; H01R 13/58; H01R 13/5804; H01R 13/582; F21V 21/02; F21V 21/03; F21V 23/00; Y10T 29/49208

USPC ......... 174/480, 481, 50, 3, 53, 58, 61, 63, 44, 174/40 R; 220/3.2–3.9, 4.02; 248/323, 317, 248/343, 906; 439/535, 536, 949
See application file for complete search history.

(56) References Cited

U.S. PATENT DOCUMENTS 4,245,878 A    1/1981   Hall
4,645,289 A    2/1987   Isban (Continued)

FOREIGN PATENT DOCUMENTS

| CA | 2471804 | 12/2005 |
|----|---------|---------|
| JP | 2003-284222 | 10/2003 |
| WO | 2012/097453 | 7/2012 |

OTHER PUBLICATIONS

Written Opinion and International Search Report on International Application No. PCT/CA2012/050028 issued Apr. 12, 2012; 8 pages.

*Primary Examiner* — Angel R Estrada
(74) *Attorney, Agent, or Firm* — Pepper Hamilton LLP

(57) ABSTRACT

The invention provides a mount for installing an electrical fixture to an electrical junction box. The mount includes a support configured for independent attachment to said junction box and said electrical fixture respectively for mounting said fixture to said junction box. The mount further includes at least one electrical quick connect member engaged to said support comprising a first connection element for forming an electrical connection with a electrical wire and a second connection element for forming an electrical connection a fixture electrical wires. The first and second connection elements are electrically connected or connectible together to form an electrical connection between the source wires and the fixture wires.

19 Claims, 11 Drawing Sheets

(51) Int. Cl.
　　*H02G 3/14*　　　(2006.01)
　　*H02G 3/18*　　　(2006.01)

(56)　　　　References Cited

U.S. PATENT DOCUMENTS

| | | | |
|---|---|---|---|
| 5,085,392 A | | 2/1992 | Perna |
| 5,317,493 A | | 5/1994 | Muller et al. |
| 5,434,356 A | | 7/1995 | Zekowski |
| 5,900,583 A | * | 5/1999 | Russo .............................. 174/61 |
| 6,146,191 A | | 11/2000 | Kerr et al. |
| 6,503,099 B2 | * | 1/2003 | Kerr, Jr. ........................ 439/537 |
| 6,653,560 B1 | * | 11/2003 | Wu ................................. 174/50 |
| 6,676,442 B2 | * | 1/2004 | Kerr, Jr. ........................ 439/537 |
| 6,761,342 B1 | * | 7/2004 | Giefer et al. ................... 248/343 |
| 6,780,049 B1 | * | 8/2004 | D'Angelo et al. ............. 439/537 |
| 6,799,982 B2 | * | 10/2004 | Kerr, Jr. ........................ 439/537 |
| 6,991,352 B2 | * | 1/2006 | Garber et al. .................. 248/343 |
| 7,064,269 B2 | * | 6/2006 | Smith ............................ 174/481 |
| 7,105,744 B1 | * | 9/2006 | Kwong et al. ................... 174/58 |
| 7,347,580 B2 | | 3/2008 | Blackman et al. |
| 8,215,920 B2 | * | 7/2012 | Criner et al. ................... 248/343 |
| 2006/0274519 A1 | | 12/2006 | Pearce et al. |

\* cited by examiner

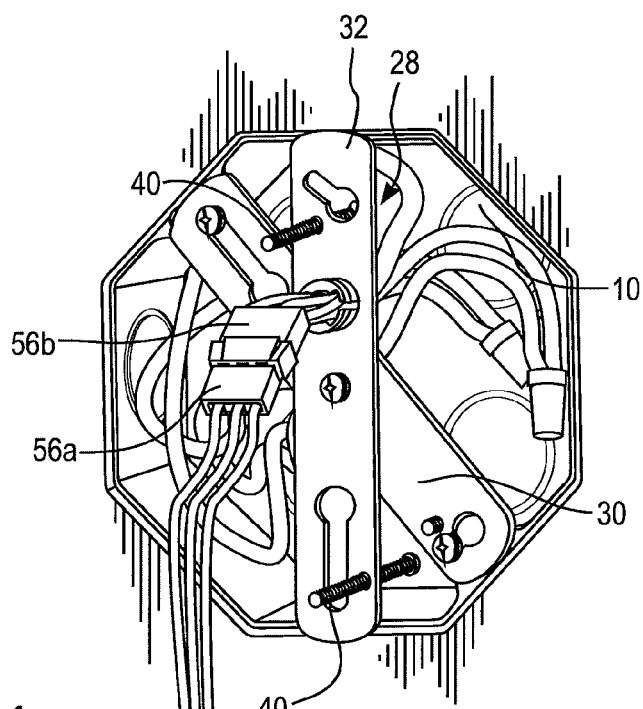
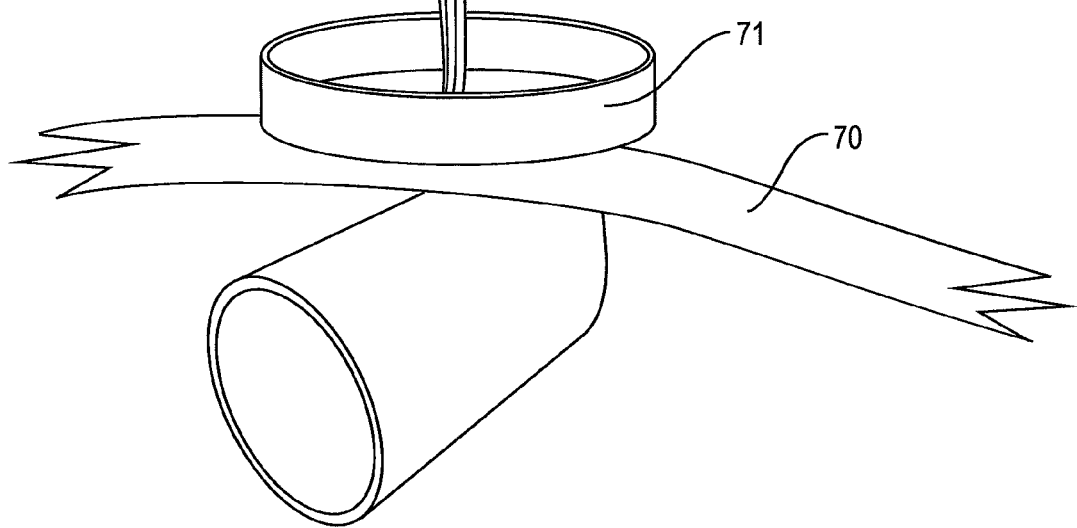
Fig. 4

SYSTEM FOR MOUNTING AN ELECTRICAL FIXTURE TO AN ELECTRICAL JUNCTION BOX

FIELD OF THE INVENTION

The present invention relates to mounting systems for electrical fixtures such as lighting fixtures, fans and the like. More specifically, the invention relates to a system and method for mounting an electrical fixture to an electrical junction box for rapid and efficient mounting of the fixture to a wall, ceiling or other surface.

BACKGROUND OF THE INVENTION

Electrical fixtures such as lighting fixtures, fans and the like are typically installed by mounting the fixture directly to an electrical junction box. Electrical junction boxes are typically installed within a wall, ceiling, or other surface. A typical junction box includes a rigid open-fronted compartment with mounting tabs projecting across the open front. Normally, the junction box is installed in a recessed fashion within the surface to provide a flush mount of the fixture against the surface. The mounting tabs include threaded openings for accepting screws or bolts for mounting a fixture, cover plate or the like. Junction boxes typically comply with various industry standards, including standard dimensions and locations for bolting a fixture to the junction box. Household wires are housed within the junction box for connection to an electrical fixture.

Typically, installation of the junction box and electrical fixtures are carried out by a licensed electrician. In many cases, the step of mounting a fixture to the junction box is a time-consuming process requiring forming individual connections of multiple wires, followed by fastening the fixtures to the junction boxes. Installation of a large number of such fixtures can represent a significant expense in the construction process, in particular when the labour is largely carried out by licensed electricians. As well, installation can be cumbersome for a single individual, particularly when installing a relatively heavy electrical fixture such as a ceiling fan or chandelier.

The prior art discloses various mounts and mounting systems for electrical fixtures. Examples include U.S. Pat. No. 5,434,356 to Zekowski, U.S. Pat. No. 5,085,392 to Perna, and U.S. Pat. No. 7,347,580 to Blackman et al., and Canadian patent application No. CA 2471804 to Cooper. However, there exists a need in the art for an improved system and method for mounting electrical fixtures to a wall, ceiling or other location, in particular in a manner in which at least a portion of the installation process can be carried out quickly and easily by a relatively unskilled worker.

SUMMARY OF THE INVENTION

According to one aspect, the invention relates to a mount for installing an electrical fixture to an electrical junction box. The term "electrical fixture" or "fixture" is used broadly herein and includes electrical devices which typically mount to an electrical junction box for connection to electrical wiring. By way of non-limiting examples, suitable fixtures include lighting fixtures, fans, hard-wired smoke detectors, and audio-visual components. A typical junction box for use with the invention consists of an industry standard recessed box for mounting in a wall or ceiling. Typical of such boxes are the 8-sided junction boxes used throughout North America as well as many other locations. Household electrical wires (referred to herein as "source wires") are housed in the box for connection to the electrical wires of a fixture.

The typical fixture for use with the invention comprises a base that houses electrical attachment wires for forming an electrical connection to the wires housed in the junction box.

In one aspect, the mount comprises a fixture mount member adapted for fastening to both of the junction box and the electrical fixture respectively. When installed, the mount member is interposed between the junction box and electrical fixture. Although various securing means for the fixture mount member are described in detail herein, it is evident that a wide variety of fastening or securing means may be adopted to serve the desired securing function. According to this aspect, the invention relates to a mount for installing an electrical fixture to an electrical junction box. The mount includes a support configured for independent attachment to said junction box and said electrical fixture respectively for mounting said fixture to said junction box. The mount includes at least one electrical quick connect member engaged to said support comprising a first connection element for forming an electrical connection with at least one of said source electrical wires and a second connection element for forming an electrical connection with at least one of said fixture electrical wires. The first and second connection elements are electrically connected or connectible together, such that when electrically connected, the fixture and source wiring is electrically connected to supply current to the fixture.

In one aspect, the mount includes comprising multiple quick connect members, each for connection with a respective source wire. Typically, the mount includes three quick connect members to connect to the positive, negative and ground wires respectively.

Various embodiments of quick connect members may be provided. In one aspect, the quick connect member comprises multiple sockets. The first electrical connection element comprises a first socket for forming a connection with a source electrical wire by insertion therein, and the second connection element comprises a second socket for forming a connection with a fixture electrical wire by insertion therein. The respective wires become electrically connected when inserted into the respective sockets.

In a further aspect, the quick connect member is integral with said support. Alternatively, the quick connect member comprises mating first and second parts, said first part comprising said first connection element and said second part comprising said second connection element, wherein said first and second parts may be coupled together to form said electrical connection. In this version, at least one of said first and second parts of said quick connect member may be disconnected from said support when supplied and may be engaged thereto by coupling said first and second parts together.

According to another aspect, the support comprises a first component for mounting to the junction box and a second component for mounting to the fixture, said first and second components being pivotally coupled together to permit rotation of said fixture relative to the junction box. Alternatively, the support comprises a monolithic plate configured for engagement to said fixture and junction box, said plate being optionally rotatable relative to said junction box or said fixture when attached thereto.

According to another aspect, the invention relates to a method for installing an electrical fixture to a junction box. The method includes the steps of providing a fixture mount comprising a support and at least one electrical quick connect member, forming an electrical connection between the source wires and the quick connect member in a first connection step, forming an electrical connection between the electrical wires of the fixture and said quick connect member in a second connection step whereby said fixture and sources wires are electrically connected, and attaching said support to said junction box and said fixture respectively.

In one aspect, the quick connect comprises two mating halves and said second connection step comprises engaging a first of said mating halves to said fixture wires and fastening a second of said mating halves to said source wires, and connecting said mating halves together to establish said electrical connection. Alternatively, the quick connect member comprises first and second sockets as described above. The first connection step comprises inserting a segment of said source wire into said first socket and said second connection step comprises inserting a segment of the fixture electrical wire into the second socket, wherein said source and fixture wires are electrically connected when inserted into said respective sockets.

According to another aspect, the invention relates to a system for installing an electrical fixture to a junction box. The system comprises a support configured for independent attachment to the junction box and electrical fixture respectively to mount the fixture to the junction box, and a wiring harness for engagement to said support. The wiring harness includes a first wire set for electrical connection to said source wires, a second wire set independent of the first wire set for electrical connection to the wires of the fixture, and a quick-connect comprising first and second quick-connect members electrically connected to the first and second wire sets respectively for forming an electrical connection therebetween when connected together. The quick-connect member may comprise interconnecting male and female elements, which when connected together form said electrical connection therebetween.

According to a further aspect, the invention relates to a mount or system as describe above, and an electrical fixture configured for engagement to said support and for electrical connection to said quick-connect member.

The present invention is further described by reference to a detailed description of embodiments thereof. It will be understood that this description is intended merely to illustrate specific embodiments, and is not intended to limit the scope of the invention with respect to any of the elements, features or components described below. The full scope of the invention will be appreciated by reference to this specification in its entirety including the claims, and includes variations of and departures from the particulars described below. It will be further understood that any directional references, dimensions and other specifics of this nature are intended only for illustration and do not limit the invention.

BRIEF DESCRIPTION OF THE DRAWINGS

FIG. 4 is a perspective view showing a further step in the installation.

DETAILED DESCRIPTION

Figure 1:
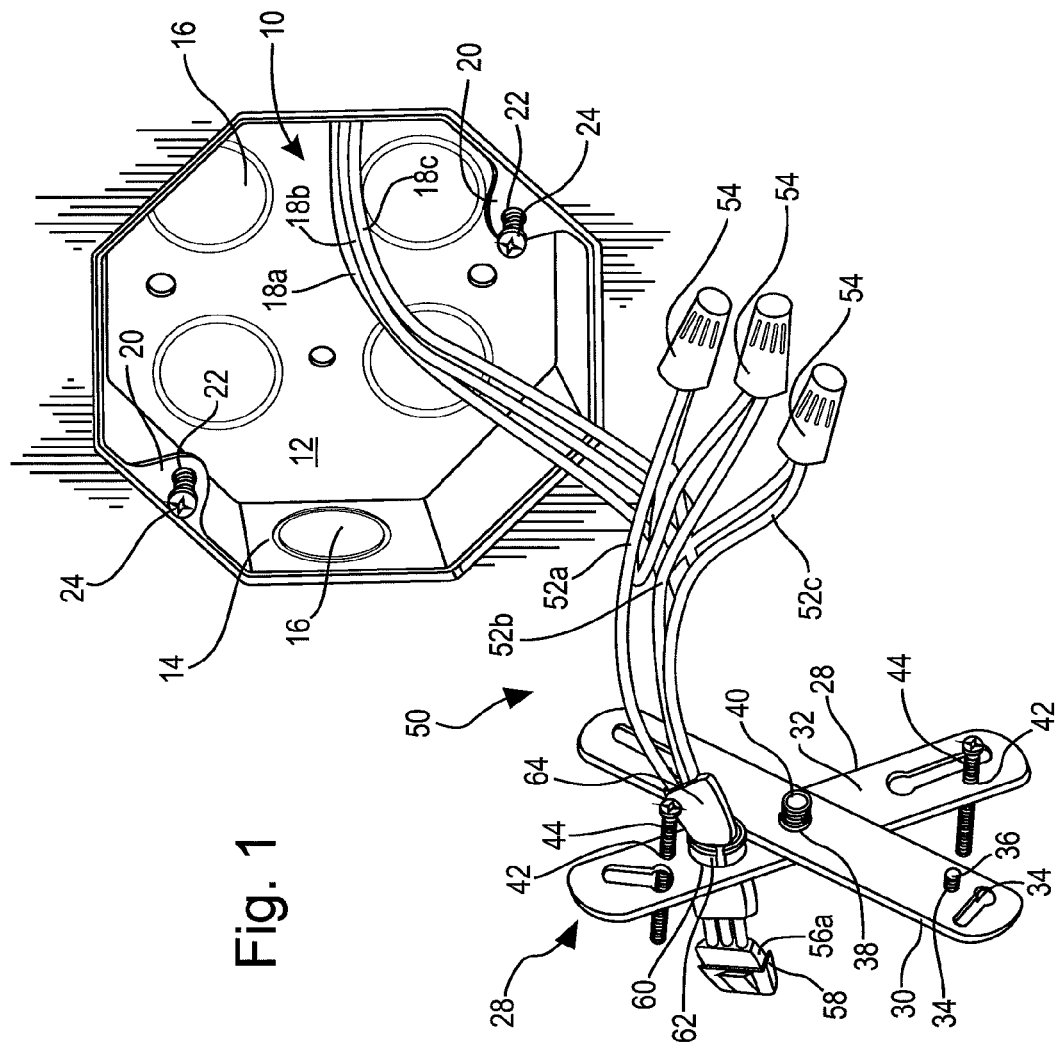
FIG. 1 is a perspective view of an embodiment of the invention, electrically connected to household wiring extending from a junction box.

Turning to the Figures, a conventional industry standard recessed-mount electrical junction box 10 is provided. Junction box 10 may comprise either metal or plastic, and consists of a solid floor 12, walls 14 and an open front. Junction box 10 is typically octagonal, although other configurations are possible. Junction box 10 includes one or more openings 16 to allow household wires 18 to enter its interior. The term "household" is used broadly and includes residential, commercial, industrial, and other applications. Wires 18 typically comprise three wires, namely the positive, negative and ground wires 18A, 18B and 18C, respectively. In a typical installation, wires 18 terminate in a segment of exposed copper core, not shown. These exposed segments are normally covered with a removable plastic cap until they are connected to an electrical fixture. Junction box 10 further comprises mounting tabs 20 which protrude inwardly across the open face of the box. Tabs 20 include internally threaded openings 22 which can receive mounting bolts 24. The spacing of openings 22 is usually conventional and meets an industry standard so as to permit mounting of a wide variety of electrical fixtures, including lighting fixtures, fans and other such fixtures.

Junction boxes, lighting fixtures and related components can be fastened together with various screw, bolts and similar fasteners. As used herein, the term "bolt" is used in the widest possible sense to refer to any form of fastener suitable for fastening electrical components together, including threaded fasteners such as bolts and screws and various unthreaded fasteners.

It will be seen that the present invention may be adapted for use with a wide variety of electrical junction boxes including non-flush mount boxes, and non-industry standard junction boxes. As well, various configurations may be used for installations such as boats, recreational vehicles and the like.

Referring to FIGS. 1-5, one embodiment of the present mounting system comprises a fixture mount 28 which when installed according to the present invention is interposed between junction box 10 and an electrical fixture 70. In the first embodiment, fixture mount 28 comprises first and second elongate flat plates 30 and 32 respectively, which are rotatably coupled at their respective midpoints to form an essentially planar X-shaped structure. However, it will be seen that in some embodiments, fixture mount 28 may alternatively comprise a single monolithic plate or other member which may be interposed between the junction box and electrical fixture.

First plate 30 includes bolt-accepting slots 34 at opposing ends for receiving bolts 24 to fasten mount 28 to junction box 10. Slots 34 are spaced to permit alignment with apertures 22 of junction box 10, so as to permit plate 34 to be bolted onto tabs 20 of junction box 10.

Second plate 32 has a similar configuration to first plate 30. Threaded through-apertures 42 are provided within plate 32 adjacent to the respective ends of plate 32. Bolts 44 are received within apertures 42. The spacing of apertures 42 meets an industry standard to permit mount 28 to be bolted to a variety of fixtures 70 such that bolts 44 can be engaged within mounting holes of a conventional electrical fixture. The relative spacing of apertures 42 may be varied depending on to permit the system to accept non-standard fixtures 70. Bolts 44 are normally supplied with the fixture, but may also be supplied with mount member 28, subject to applicable regulations or rules governing the use of attachment members for electrical fixtures.

Plates 30 and 32 include aligned internally threaded apertures 38, located at the respective midpoints of plates 30 and 32. Threaded bolt 40 extends through the aligned apertures whereby when bolt 40 is loosened, plates 30 and 32 may rotate freely with respect to each other. When bolt 40 is sufficiently tightened, plates 30 and 32 are essentially immobile relative to each other, or at least firmly held together. At an intermediate level of tightening, plates 30 and 32 resist movement but permit rotation when sufficiently urged.

Bolts 44 are dimensioned to accommodate a variety of conventional electrical fixtures. Bolts 44 may be supplied with mount 28 in a package or kit, or the installer may use (or may be required to use) fasteners supplied with electrical fixture 70.

Mount 28 further comprises a wiring harness 50 which is configured for forming an electrical attachment to household wires 18. As mentioned, household wires 18 normally comprise a bundle of three wires (18A-C), consisting of positive, negative and ground wires. Each wire 18 conventionally comprises a core, such as a copper core, and an insulating sheath.

Figure 2:
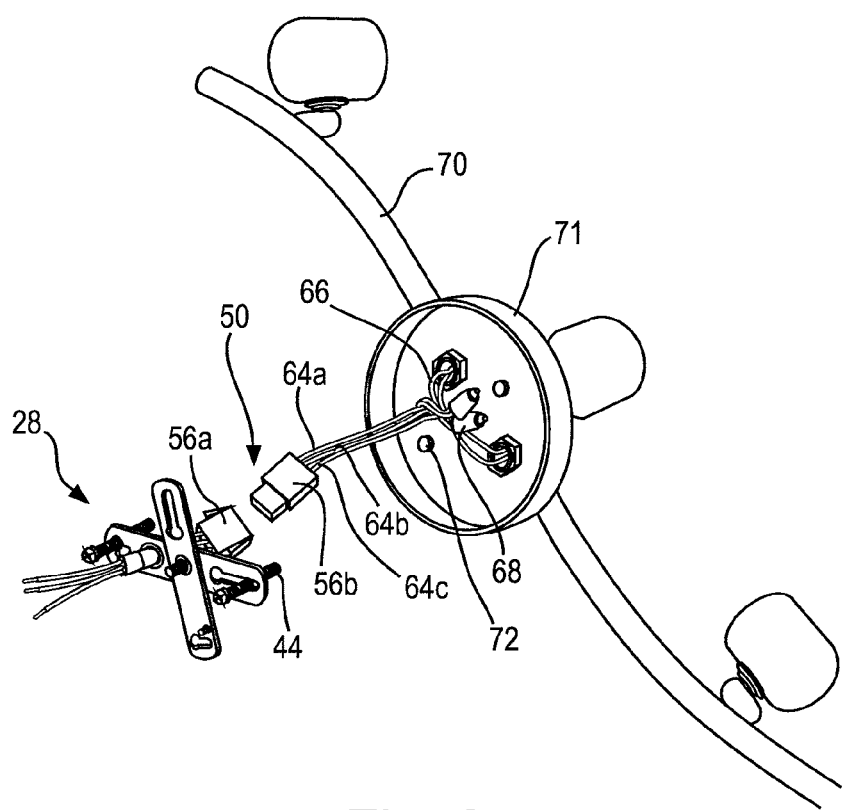
FIG. 2 is a perspective view thereof.

As seen in FIG. 2, wiring harness 50 comprises two sets of electrical wires 52 and 64, which are electrically connected together in a releasable fashion by a quick-connect attachment 56. Quick-connect 56 comprises connectible female and male halves 56A and 56B which when coupled together form an electrical connection. For safety reasons, the female connector half 56A is normally attached onto the "live" (household) side of the electrical wires. First wire set 52 comprises electrical wires 52A-C, for connecting with household wires 18A-C. End segments of wires 52 are stripped to expose their cores for electrical connection to the cores of corresponding household wires 18 in a conventional fashion using wire connectors 54. It is contemplated that this stage of the installation process may be performed by a qualified electrician, particularly for commercial or industrial applications. The opposed ends of wires 52 are electrically connected in a substantially permanent, non-removable fashion to quick-connect half 56A. Quick-connect 56 comprises a moulded plastic component, in which parts 56A and 56B snap together to establish an electrical connection as well as a robust physical connection whereby respective parts cannot be accidentally separated. Quick-connect 56 includes internal electrically conductive leads, not shown, which establish an electrical connection between the respective halves and the corresponding wire sets 52 and 64. Quick-connect 56 also includes mating locking elements 58, which lock the respective halves together in a secure fashion.

Second plate 32 comprises an opening 60 which forms a passageway for wires 52 to extend through plate 32. Preferably, the rim of opening 60 includes a resilient flange 62 for frictionally engaging wires 64 where these extend through opening 60. Harness 50 further comprises a sheath 65 surrounding the bundle of wires 64 where these pass through opening 60. Opening 60, flanges 62 and sheath 65 are thus configured to provide a snug, non-slip retention of wires 64 within opening 60 to secure these to plate 32.

Wires 64A-C extend from quick connect half 56B of the quick-connect and are electrically connected to quick connect half 56B in a permanent, non-removable fashion. Wires 64 each comprise an exposed core at their free ends, each of which may be connected to a corresponding wire 66 of the lighting fixture. This connection is made by joining together the respective wire cores in a conventional fashion, as seen in FIG. 2, using wire connectors 68. It will be seen that any suitable means to connect the respective wires may be used for this step. FIG. 2 illustrates a conventional lighting fixture 70, which may comprise essentially any suitable electrical fixture intended for mounting to a conventional junction box within a wall, ceiling or other surface. Fixture 70 normally includes a base 71 which has a hollow interior to house the electrical wires of the fixture as well as other electrical components of fixture 70.

Installation of the present system will now be described by further reference to FIGS. 1-5. A fixture mount member 28 is normally supplied with the quick connect halves 56A and B connected together. These are disconnected whereby wire set 64 can be separately fastened to fixture wires 66 in a subsequent step. The respective wires 52A-C are then connected to the exposed cores of household wires 18A-C. The connection between the respective wires 52 and 18 is performed in a conventional fashion using wire connectors 54.

In the next step, wire set 64 is connected to electrical fixture wires 66, to provide the connection shown in FIG. 2. As above, this connection is made in a conventional manner by connecting the respective wire cores using connectors 68. Once the fixture mount member has been electrically connected to the fixture, it may be physically connected to the fixture by fastening fixture mount member 28 to fixture 70 with screw or bolts 44, which are threaded into pre-existing threaded holes 72 within fixture 70, which are located within the interior of base 71. At this stage, the fixture and associated components of mount 28 remain physically separate from junction box 10 and the associated half of wiring harness 50. Mount 28 is configured to fit within the interior of base 71. It will be seen that a variety of sizes of mount 28 may be provided to fit within the bases of a variety of electrical fixtures. It will also be seen that the electrical fixture need not include a hollow base, in which case the mount member 28 may be exposed.

Figure 3:
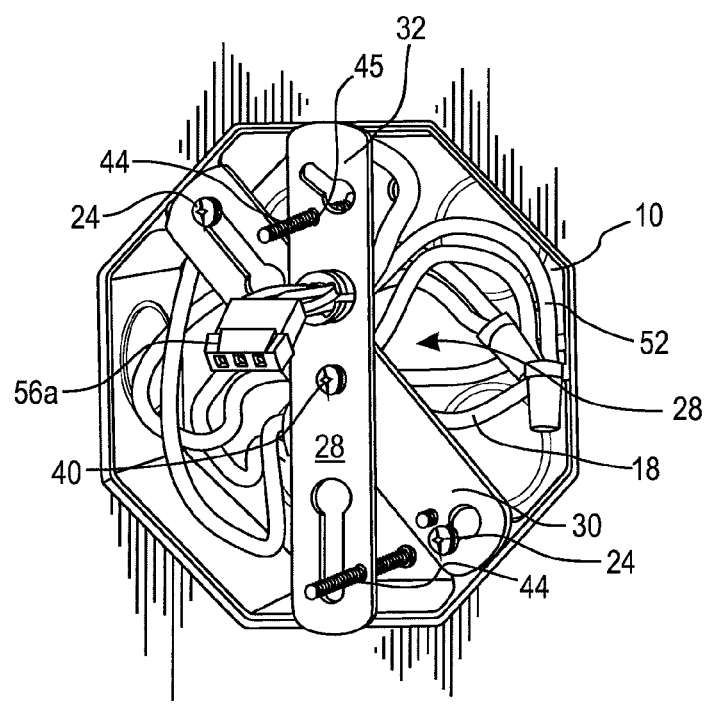
FIG. 3 is a perspective view, showing installation of the system to a junction box.

The next step in the installation process involves electrically connecting the respective halves 52 and 64 together with quick connect 50 by joining the respective halves together. This step may be performed by snap-locking the halves together, or with a friction fit of the halves. This step is followed by mounting the fixture to the junction box by securing fixture mount member 28 and associated fixture 70 to the junction box 10, as shown in FIG. 3, by fastening these components together with bolts or screws 24 or 36, as selected.

Mount 28 permits angular (rotational) position of fixture 70 to be adjusted on a plane parallel to the mounting surface (eg the wall or ceiling within which the junction box is mounted). The rotational position of the fixture is determined by the position of second plate 32 relative to first plate 30. The installer can set the desired rotational position either before or after fastening the fixture to the junction box. If it is desired to limit the ability of the fixture to rotate after installation, the installer may set the desired rotational position of respective plates 30 and 32 prior to mounting the fixture, and tighten bolt 40 sufficiently to prevent further rotation.

Figure 5:
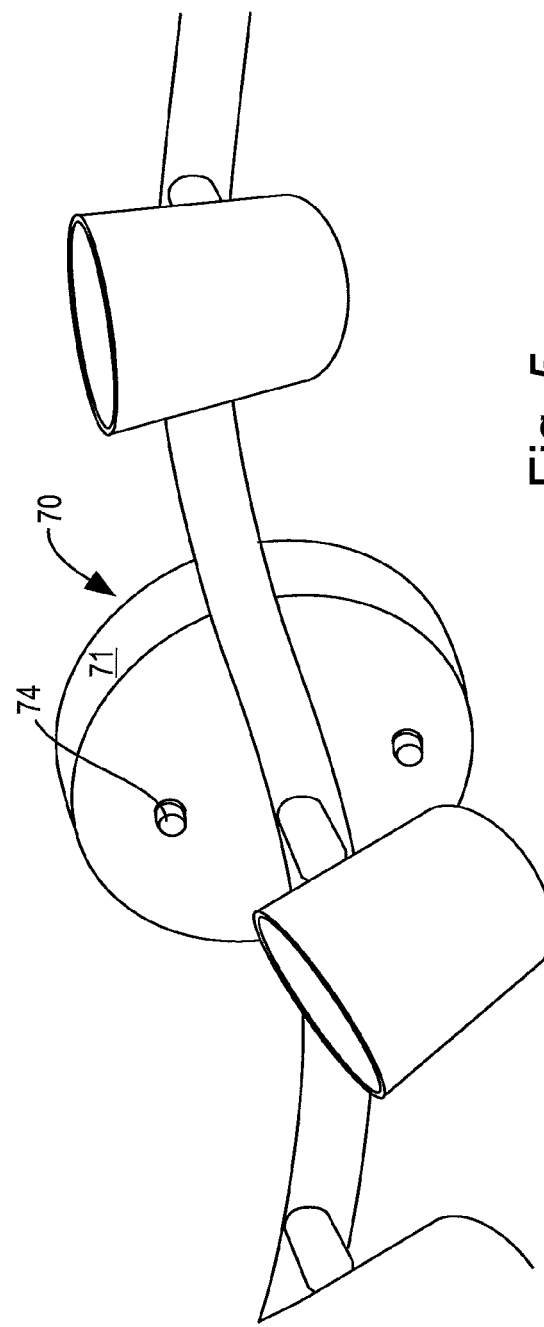
FIG. 5 is a perspective view, showing the final installation step of an electrical fixture.

After fixture 70 is installed, decorative-faced nuts 74 are then tightened onto the exposed ends of bolts 44, as shown in FIG. 5. At this stage, fine adjustment of the angular position of fixture 70 may be made, if bolt 40 is sufficiently loose to permit such adjustment.

Figure 6:
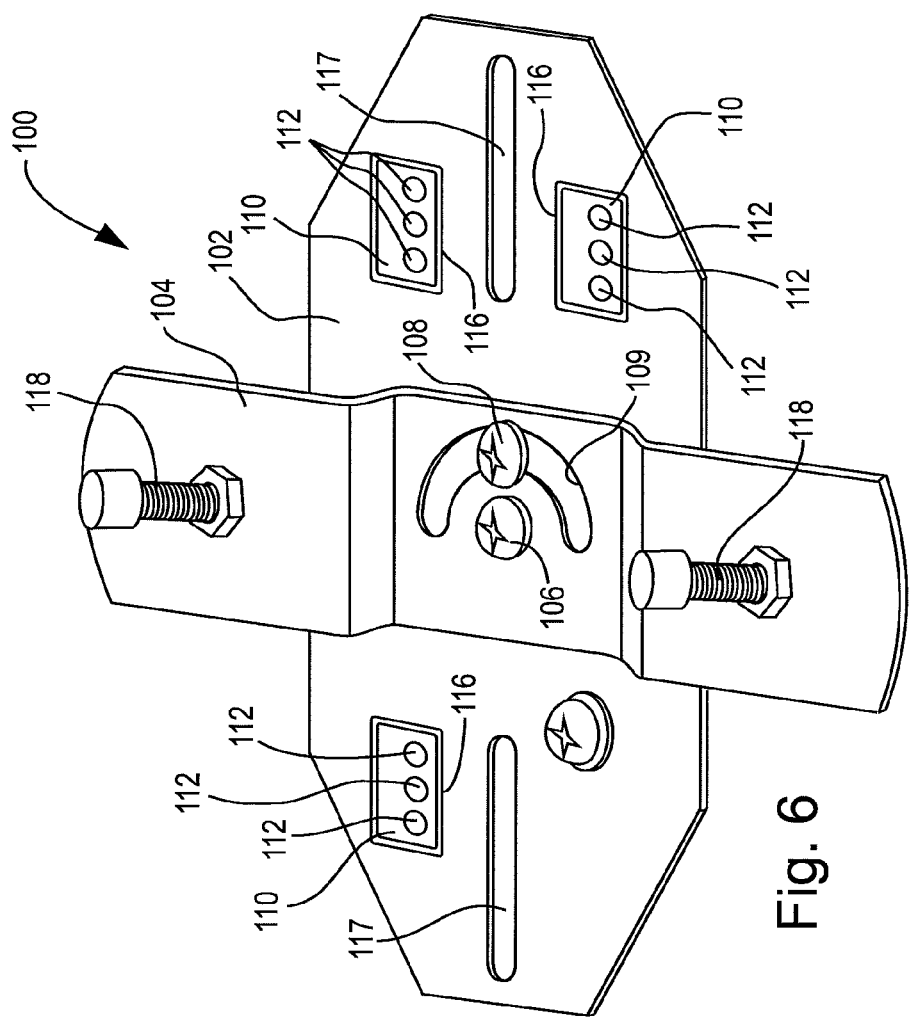
FIG. 6 is a perspective view of a second embodiment of the invention.
Figure 7:
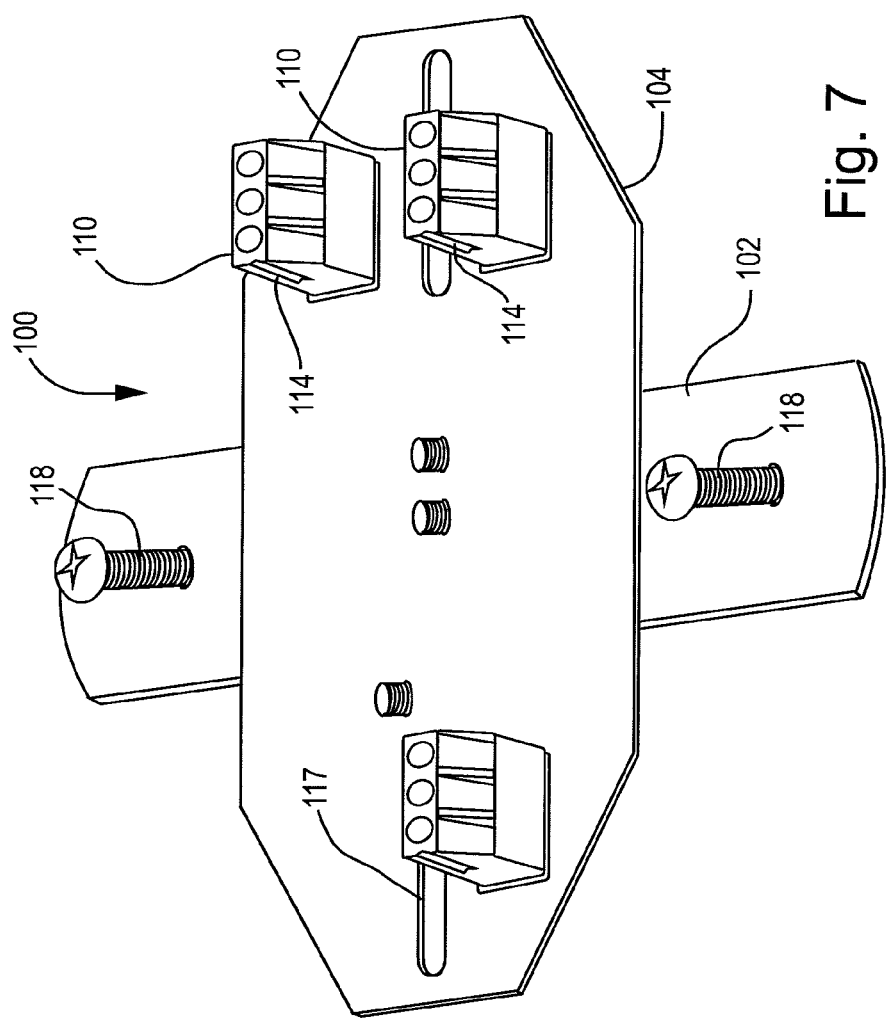
FIG. 7 is a further perspective view opposed to FIG. 6.

FIGS. 6 and 7 show a second embodiment of the invention. According to this embodiment, a fixture mount member 100 comprises a two-part structure composed of base plate 102 and fixture mount plate 104. Plates 102 and 104 connect together intermediate their respective ends by way of a pivot connector 106, such as a centrally-located screw that fastens respective plates 102 and 104 together and permits rotation of the respective plates. Plates 102 and 104 are fixed in position relative to each other by a set screw 108 on plate 102. Screw 108 travels within a semicircular slot 109 within plate 104 to permit adjustment of the angular position of plates 102 and 104 relative to each other. When the respective plates are at a selected position, screw 108 may be tightened to engage plate 104 to plate 102.

Base plate 102 supports an array of three electrical connectors 110. Connectors 110 each comprise a conventional "push in" type of connector, which permits rapid connection to electrical wires by the simple process of inserting a wire, usually into a socket to form a secure electrical connection which resists release. The inserted segment of the wire may comprise an unsheathed core. The three connectors 110 correspond to the household positive, negative and ground wires respectively. It will be seen that connectors 110 may comprise alternatives to the connectors described and depicted herein, wherein the connector may be mounted to base plate 102 and wherein the connector permits easy and quick connections to household and fixture wires formed independently of each other. Each connector 110 comprises multiple fixture wire sockets 112 on one side to receive one or more wires (not shown) from an electrical fixture and a source wire socket 114 at the opposing end for connection to a household wire. Sockets 114 are color-coded for connection to the positive, negative or ground household wires. Multiple sockets 112, typically three, are provided within each connector 110 to allow connection to multiple electrical components within a fixture.

Connectors 110 protrude through openings 116 within plate 102 whereby fixture wire sockets 112 are exposed to one side of plate 102 and source wire socket 114 is exposed to the opposed side of plate 102. Connectors 110 fasten to plate 102 by suitable means, for example by comprising a removable flange that may be secured to engage the edges of opening 116, flexible tables that engage plate 102 or or a snug friction fit between connectors 110 and plate 102.

Fixture wire sockets 112 are configured to receive a short segment of unsheathed core of the fixture wire, such as a multi-strand copper wire core, and snugly retain this segment to prevent inadvertent removal from socket portion 112. It will be seen that connector 110 may be adapted to connect to fixture wires of any suitable type such as a solid wire core or a sheathed wire segment.

Base plate 102 is configured to fasten to junction box 10. For this purpose, screws or bolts (not shown) are used to securely fasten opposing ends of plate 102 to the boltholes 22 within junction box 10. The screws or bolts travel within slots 117 extending through plate 102, which permit a degree of linear adjustment of mount member 100. It will be seen that when mounted to junction box 10, plate 102 is fixed in position relative to junction box 10 while fixture mount plate 104 may rotate relative thereto, within an arc defined by slot 109.

Fixture mount plate 104 comprises a flat mid-section and offset end regions which are spaced from base plate 102 to provide clearance for connectors 110. Plate 104 further comprises fixture mount bolts 118 at the respective ends thereof for attachment to a fixture. Bolts 118 may comprise oversized, hand-tightenable end knobs, as shown, to permit tool-free mounting of the electrical fixture to member 100.

In use, installation of fixture mount member 100 can be performed in two phases. In an initial phase, a fixture mount member 100 is provided, and electrical connections are formed between the household wires 18A-C and the corresponding wire sockets 114 of member 100. Member 100 is then secured to junction box 10. This connection is formed by inserting corresponding ones of wires 18A-C into respective sockets 114 of three corresponding connectors 110, one for each of wires 18A-C. Because the electrical work in this phase involves household wiring, this step may be performed by a qualified electrician. In a project involving the installation of multiple fixtures, the electrician may connect all of the required mount members 100 to the respective junction boxes, and leave the installation in this condition for the completion of phase 2 at a later stage of the construction project.

In the second installation phase, an electrical fixture is provided (not shown) in which the electrical wires have a core comprising an unsheathed end segment. The electrical wires of the fixture are then connected to connectors 110 of mount 100, such that the positive, negative and ground wires correspond to the corresponding color-coded connectors 110. In some cases, the fixture may comprise multiple electrical connections, such as a combination fan and lighting fixture. For these applications, the multiple fixture wires are connected to the multiple sockets 112 within connectors 110. The step of connecting the fixture wires to connectors 110 comprises inserting the unsheathed cores of the fixture wires into the appropriate sockets 112. Due to the simplicity of this step, it need not be performed by a qualified electrician, and it is contemplated that this step will be performed in a subsequent phase of construction after the initial connections are formed. After the fixture leads are thus connected, the fixture is itself fastened to member 100 with bolts 118.

Figure 8:
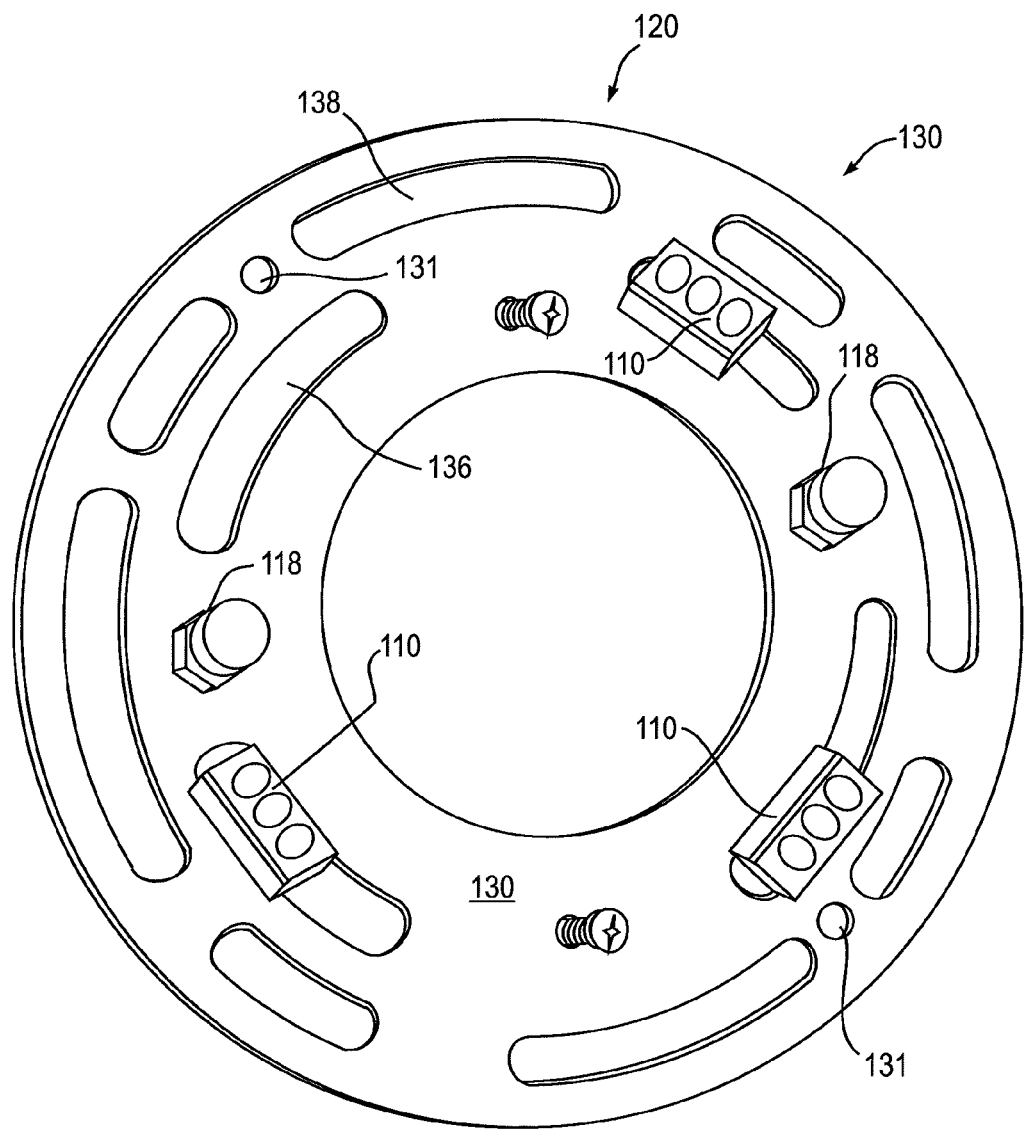
FIG. 8 is a plan view of a fixture mount according to a further embodiment of the invention.
Figure 9:
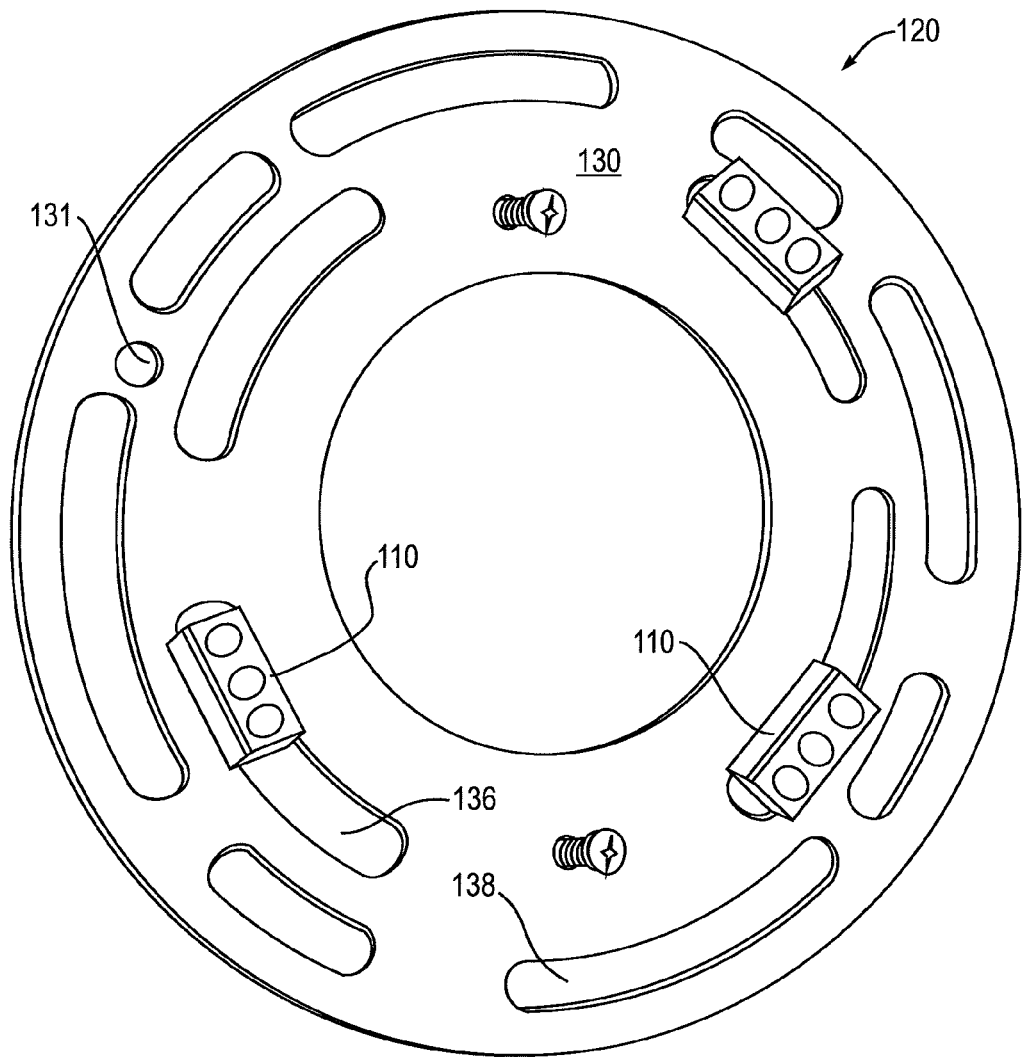
FIG. 9 is a perspective view of the third embodiment.
Figure 10:
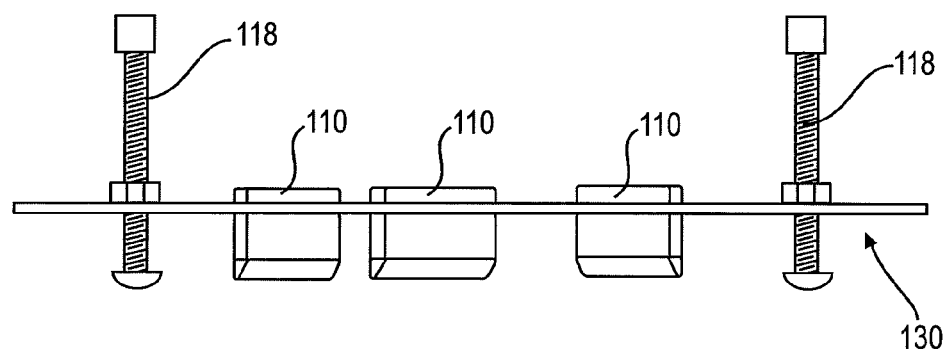
FIG. 10 is a side elevation of the fixture mount of FIG. 8.

In a further embodiment, shown in FIGS. 8-10, the fixture mounting system 120 comprises a plate 130 configured as a flat metal annular disc. Plate 130 has an array of arcuate, circumferentially-arranged slots extending therethrough, which are arranged in an inner ring of slots 136 and an outer ring of slots 138. Slots 136 are configured to receive an array of connectors 110 as described above. Connectors 110 fit within slots 136 in a friction fit. Slots 138 are configured to align with the openings 22 of a junction box 10 (shown in FIG. 1) to permit plate 130 to be mounted to a junction box via mounting bolts 24. Slots 138 are configured such that bolts 24 can pass through these slots, wherein their heads engage plate 130. When bolts 24 are loose, plate 130 may be rotated relative to the junction box. Tightening of bolts 24 secures plate 130 in a desired position. Partial tightening of bolts 24 permits plate 130 to be securely retained in a desired position, while still permitting rotation when sufficient force is applied. Upon final installation, bolts 24 should be securely fastened to prevent inadvertent movement or release of fixture 70. Slots 136 and 138 may comprise various alternative configurations and dimensions. For example, these slots may have an angular length ranging between 5 and 60 degrees of circumference, to permit a variable amount of rotational adjustment of the system.

Alternatively to the slots described above, bolt holes 131 may be provided for non-rotational fastening of plate 130 to junction box 10 with mounting bolts.

Mount system 120 further comprises fixture mount bolts 118 for mounting the disc to an electrical fixture. Installation of plate 130 is similar to the preceding embodiment wherein an initial connection is formed between the household wires and connectors 110, followed by securing plate 130 to junction box 10. In a second phase, an electrical fixture is electrically connected to connectors 110, followed by securing the fixture to plate 130. Depending on the degree of tightness of bolts 24 securing plate 130 to junction box 10, the rotational position of the electrical fixture may be adjusted after installation.

Figure 11:
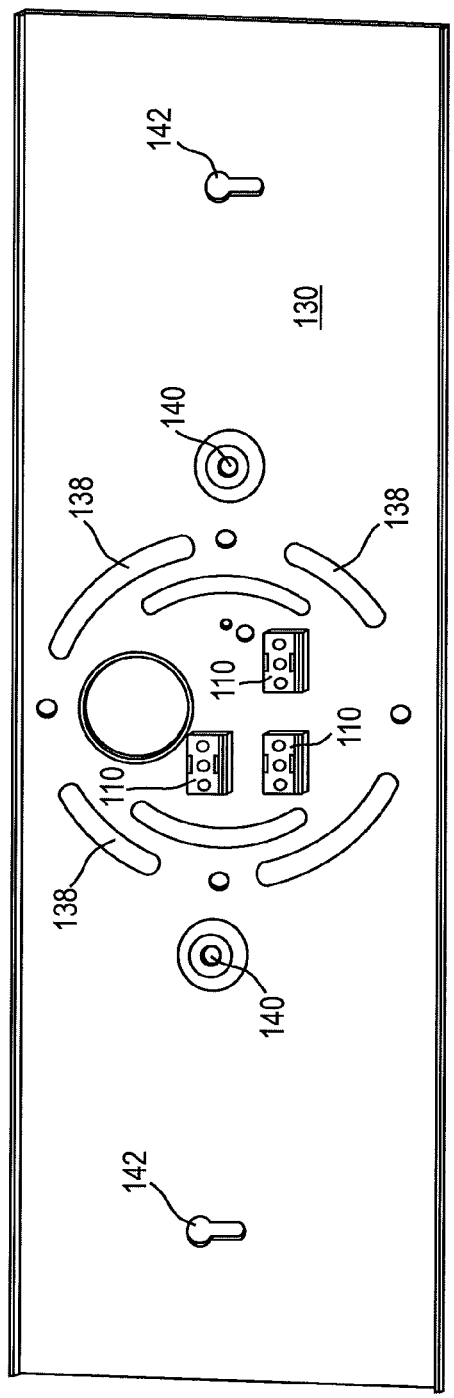
FIG. 11 is a plan view of a further embodiment of the present system.

A further embodiment, shown in FIG. 11, is similar in to the embodiment of FIGS. 8-10. However, plate 130 is rectangular, as is particularly suited for use with fixtures that have a relatively large base. Connectors 110 are installed to plate 130 through openings, not shown, within plate 130. Bolt holes 140 are configured to permit attachment of plate 130 to the base of a light fixture. Arcuate slots 138 are configured to permit attachment to the junction box by securing with the junction box bolts, not shown. Keyhole slots 142 permit optional fastening of plate 130 to the wall with screws or bolts, not shown.

Although the present invention has been described at least in part by way of a description of particular embodiments thereof, including specific components, elements and other aspects, it will be seen that the present invention is not limited to the particulars described in detail herein. Rather, the invention encompasses departures from and variations of such particulars. The present invention is further described by way of the present claims, including such variations, departures and equivalents as would be understood by persons skilled in the art.

The invention claimed is:

1. A kit for installing an electrical fixture to an electrical junction box, wherein said fixture comprises fixture electrical wires and said junction box houses source electrical wires;
said kit comprising a base configured for independent attachment to said junction box and said electrical fixture respectively for mounting said fixture to said junction box, said base further comprising a plurality of first quick connect members fastened to said base for electrical connection to respective ones of said source electrical wires, said kit further comprising a plurality of second quick connect members for independently coupling to respective ones of said fixture electrical wires, each of said second quick connect members comprising a push-in socket for receiving a corresponding one of said fixture electrical wires wherein an electrical connection is formed upon inserting said fixture electrical wire into said socket, wherein said second quick connect members are configured to independently couple to respective ones of said first quick connect members by a push-together engagement for forming an electrical connection when coupled together, wherein said base comprises a monolithic member configured for mounting directly to both of said fixture and said junction box, said base being rotatable relative to said junction box and/or said fixture when attached thereto.

2. The kit of claim 1 wherein said base further comprises a plurality of first arcuate slots configured to rotatably secure said fixture to said base or to rotatably secure said base to said junction box.

3. The kit of claim 1 wherein said base further comprises at least one second arcuate slot configured to slideably retain at least one of said first quick connect members.

4. The kit of claim 1 wherein said first quick connect members each comprise a push-in socket for receiving a corresponding one of said source electrical wires whereby electrical connections are formed upon inserting said source wires into respective ones of said sockets.

5. The kit of claim 1 wherein said first and second quick connect members comprise snap-locking connection means for coupling respective ones of said quick connect members by snap-locking together.

6. The kit of claim 1 wherein said base comprises a flat plate.

7. A method for installing an electrical fixture to a junction box, wherein said fixture comprises fixture electrical wires for attachment to source wires and said junction box houses source electrical wires, said method comprising the steps of providing a fixture mount comprising a monolithic base configured for mounting directly to both of said junction box and said electrical fixture, and a plurality of first electrical quick connect members mounted to said base, forming electrical connections between each of said source electrical wires and respective first quick connect members, providing a plurality of second quick connect members comprising a push-in socket for receiving a corresponding one of said fixture electrical wires, forming electrical connections between each of said fixture electrical wires and respective ones of said second quick connect members by inserting said electrical source wires into sockets of respective ones of the second quick connect members, electrically connecting respective ones of the first and second quick connect members by coupling respective first and second quick connect members together, installing said base to the junction box and mounting the fixture to the base, wherein said first and second quick connect members are coupled by snap-locking together.

8. The method of claim 7 wherein said electrical connections between said first quick connect members and said source electrical wires comprise inserting each of said source electrical wires into corresponding sockets in respective ones of said first quick connect members.

9. The method of claim 7 wherein said base is rotatable relative to said fixture and/or said junction box when mounted thereto, said method comprising the further step of rotatably adjusting the position of said fixture when mounted to said base.

10. The method of claim 7 wherein said base comprises a generally flat plate.

11. A mount for installing an electrical fixture to an electrical junction box, wherein said fixture comprises fixture electrical wires and said junction box houses source electrical wires; said mount comprising a monolithic base configured for independent attachment directly to said junction box and said electrical fixture respectively for mounting said fixture to said junction box, and a plurality of quick connect members fastened to said base for forming electrical connections between respective ones of said source electrical wires and said fixture electrical wires, said quick connect members each comprising a plurality of sockets configured to receive and retain therein unsheathed cores of the source and fixture wires in respective ones of the sockets wherein an electrical connection may be formed upon inserting an unsheathed core of a fixture electrical wire and an unsheathed core of a source electrical wire into respective ones of said sockets.

12. The mount of claim 11 wherein said base is rotatable relative to said junction box and/or said fixture when attached thereto.

13. The mount of claim 12 wherein said base comprises a plurality of first arcuate slots configured to rotatably secure said fixture to said base and/or to rotatably secure said base to said junction box.

14. The mount of claim 11 wherein said base comprises at least one second arcuate slot configured to slideably retain at least one of said quick connect members.

15. The mount of claim 11 wherein said base has an opening therein aligned with the interior of said junction box when mounted thereto for routing electrical wires from the fixture to the interior of the junction box.

16. The mount of claim 11 wherein said quick connect members extend through openings in said base whereby a first of said sockets of each quick connect member is exposed to an upper side of said base and a second of said sockets is exposed to an opposed lower side of said base.

17. A method for installing an electrical fixture to a junction box, wherein said fixture comprises fixture electrical wires and said junction box houses source electrical wires, wherein said wires each terminate in an unsheathed segment of wire core, said method comprising the steps of securing a base to said junction box, said base configured for independent attachment to said junction box and said electrical fixture respectively, said base having quick connect members mounted thereto each comprising a push-in socket connector comprising multiple sockets, inserting the unsheathed cores of said source wires into corresponding ones of the sockets of said quick connect members, inserting the unsheathed cores of said fixture wires into corresponding sockets of said quick connect members to thereby form an electrical connection between said source wires and said fixture wires, and securing the fixture to the base to thereby secure the fixture to the junction box with the base interposed between the fixture and the junction box.

18. The method of claim 17 wherein said base is rotatable relative to said fixture and/or said junction box when fastened thereto, said method comprising engaging the fixture to the base, rotatably adjusting the position of said fixture, and securing the fixture to the base to prevent further movement thereof.

19. The method of claim 17 wherein said base comprises a monolithic member configured for directly mounting to both of said fixture and said junction box, said base being rotatable relative to said junction box and/or said fixture when attached thereto.

\* \* \* \* \*